Patented Feb. 18, 1930

1,747,588

UNITED STATES PATENT OFFICE

WILLIAM H. LOHMANN, OF WILMINGTON, DELAWARE, ASSIGNOR TO GENERAL CHEMICAL COMPANY, OF NEW YORK, N. Y., A CORPORATION OF NEW YORK

PROCESS OF DIGESTING PHOSPHATE ROCK

No Drawing. Application filed May 17, 1927. Serial No. 192,167.

This invention relates to improvements in the process of manufacturing sodium phosphate and more particularly to improvements in the process of digesting phosphate rock with sulfuric acid and nitre cake in the preparation of a liquor suitable for the direct production of sodium phosphate according to the process described in the United States patent to E. H. Strickler, No. 744,128 of 1903.

In carrying out the process of digesting phosphate rock with sulfuric acid and nitre cake as heretofore known, ground phosphate rock is first added to the make-up liquor. This make-up liquor normally consists of the liquors resulting from the washing of the mud from the digest and contains more or less phosphoric acid. A small amount of sulfuric acid is then introduced and the nitre cake, ground or chipped, is finally added in the calculated amount for the decomposition of the phosphate rock. The mix is agitated until the digestion is complete and allowed to settle. The decomposition of the phosphate rock by the free acid and the acid of the nitre cake takes place with the evolution of considerable heat, thereby causing a rise in the temperature of the digesting liquor. Frequently it is found that there are in the mud, resulting from the digestion of the rock, considerable amounts of a sodium salt in insoluble form. I have found that this insoluble precipitate containing sodium is a substance having apparently the composition and properties of glauberite, a compound salt of calcium and sodium sulfates. Furthermore, I have found that this precipitate occurs when the temperature of the digesting liquor is permitted to rise above a certain limit and that when the temperature is regulated and maintained below such a limit no precipitate will occur.

It is the object of my invention to so control the temperature of the liquor throughout the period of digestion as to prevent the precipitation of this glauberite with the consequent loss of sodium and to provide an efficient process for the digestion.

More particularly, I have discovered that if the temperature of the digest liquor is maintained below 150° F., the digestion may be efficiently conducted and there will be no precipitation of this compound salt known as glauberite, with the consequent loss of sodium sulfate. Accordingly, my invention consists in so regulating the temperature of the digesting liquor prior to and during the digestion that at no time shall it exceed 150° F.

By way of illustration, I give the following example as a preferred method of carrying out my invention.

Make-up liquor, preferably liquor resulting from the washing of mud from a previous digestion, at a temperature of about 120–125° F. is introduced into a digestion tank. The entire charge of ground phosphate rock is first added, subsequently a small amount of sulfuric acid, and then the ground or chipped nitre cake. The proportion of acid is ordinarily controlled so that the resulting digest liquor shall test about 1% free sulfuric acid. The proportion of nitre cake to phosphate rock is preferably regulated so that the ratio, by weight, of $Na_2SO_4$ to $P_2O_5$ in the resulting digest liquor shall be about 2.75–2.85 to 1 as more fully pointed out and claimed in my co-pending application Serial No. 192,166, dated May 17, 1927. The mixture of rock, nitre cake, and acid thus prepared is agitated and, as the recomposition proceeds with the evolution of heat, the temperature gradually rises. As a result of the specific procedure adapted in this particular method of preparing the digest liquor, conditions have been established which so control the maximum temperature that while it may approximate 145–150° F. it will not to any material extent exceed 150° F. Under these conditions, the digestion proceeds rapidly and efficiently. Since, however, the temperature does not exceed 150° F., practically no glauberite will be formed or precipitated and consequently a negligible loss of sodium sulfate with the mud from the rock will occur. After thorough digestion, the mud is permitted to settle, and the clear supernatant liquor is decanted. This liquor may be treated in the usual manner whereby it is evaporated and the solid residue furnaced with carbonaceous fuel to produce sodium phosphate.

Various means may be used to control the maximum temperature of the digesting liquor. In the above example, the temperature of the make-up liquor is regulated so that the temperature rise, due to the evolution of heat in the digestion process, will not produce a resulting temperature of the liquor above the maximum limit of 150° F. Similarly, the digestion may be conducted in two or more stages with intermediate cooling of the digest liquor between the several additions of acid and nitre cake to the phosphate rock charge. Or the liquor may be positively cooled as the digestion proceeds.

Various modifications may be made in the manner of carrying out my invention, and in fact it is applicable to the preparation of any liquor which contains sodium sulfate and calcium sulfate in more or less concentrated solution. I do not wish, therefore, to limit the scope thereof to its particular application to the digesting of phosphate rock with sulfuric acid and nitre cake except as defined in the appended claims.

I claim:

1. In the process of preparing a liquor containing calcium and sodium sulfates, the step of causing a heat evolving reaction between materials adapted to form such a liquor, under such control that the temperature of the liquor is maintained below 150° F.

2. In the process of digesting phosphate rock with sulfuric acid and nitre cake, the step of maintaining the temperature of the digest liquor below the temperature at which glauberite will be precipitated therefrom.

3. In the process of digesting phosphate rock with sulfuric acid and nitre cake, the step of controlling the conduct of the reactions in such a manner as to prevent the temperature developed during the progress of the reactions from rising higher than 150° F.

4. The process of digesting phosphate rock which comprises introducing a charge of said rock into a liquor resulting from the washing of the mud from a previous digestion, adding sulfuric acid and nitre cake thereto, and controlling the temperature of the resulting liquor to maintain the same below 150° F. throughout the period of digestion.

In testimony whereof, I affix my signature.

WILLIAM H. LOHMANN.